United States Patent [19]

Bruinette et al.

[11] 4,121,325
[45] Oct. 24, 1978

[54] CABLE ANCHORING AND COUPLING EQUIPMENT

[75] Inventors: Konstant E. Bruinette, Johannesburg; Ulrich E. O. B. Brand, Verwoerdburg, both of South Africa

[73] Assignee: Triple Bee Prestress (Proprietary) Limited, Pretoria, South Africa

[21] Appl. No.: 747,872

[22] Filed: Dec. 6, 1976

[51] Int. Cl.² .................. F16G 11/04; F16G 11/00
[52] U.S. Cl. ..................... 24/122.6; 24/115 K; 403/210; 403/216; 52/230
[58] Field of Search ............. 24/122.6, 115 K, 115 M; 403/210, 209, 216, 213; 52/223 L, 230

[56] References Cited

U.S. PATENT DOCUMENTS

| 1,686,288 | 10/1928 | Meals | 403/210 |
|---|---|---|---|
| 1,695,189 | 12/1928 | Clark | 403/209 |
| 2,309,751 | 2/1943 | Chance | 24/115 K |
| 2,677,956 | 5/1954 | Schorer | 52/230 |
| 3,775,811 | 12/1973 | Smrekar | 24/122.6 |
| 3,795,949 | 3/1974 | Shorter | 24/115 M |
| 3,855,414 | 12/1974 | Alleva | 24/112.6 |
| 3,909,142 | 9/1975 | Surr | 24/122.6 |
| 3,983,606 | 10/1976 | Bruinette | 24/122.6 |

FOREIGN PATENT DOCUMENTS

| 74,607 | 4/1917 | Austria | 403/209 |
|---|---|---|---|
| 526,786 | 6/1956 | Canada | 52/230 |
| 90,193 | 8/1957 | Norway | 403/213 |
| 455,218 | 4/1968 | Switzerland | 52/230 |

*Primary Examiner*—Bernard A. Gelak
*Attorney, Agent, or Firm*—Cushman, Darby & Cushman

[57] ABSTRACT

The invention is concerned with an anchor and coupler unit for use with stressing cables in reinforced concrete structures. The unit comprises a base plate having an aperture therethrough and supporting a cable anchor the body of which includes an external surface curved convexly towards the socket base and spaced apart therefrom and adapted to receive a looped end of a reinforcing cable wherein the body is preferably separate from the base plate and the latter in the form of a socket which has a peripheral flange extending towards the cable anchor body and a conical housing around the aperture extending on the opposite side of the plate to the flange. Also the anchor preferably has a pair of oppositely extending semi-cylindrical projections each providing a curved surface spaced from the base plate.

5 Claims, 3 Drawing Figures

U.S. Patent
Oct. 24, 1978
4,121,325
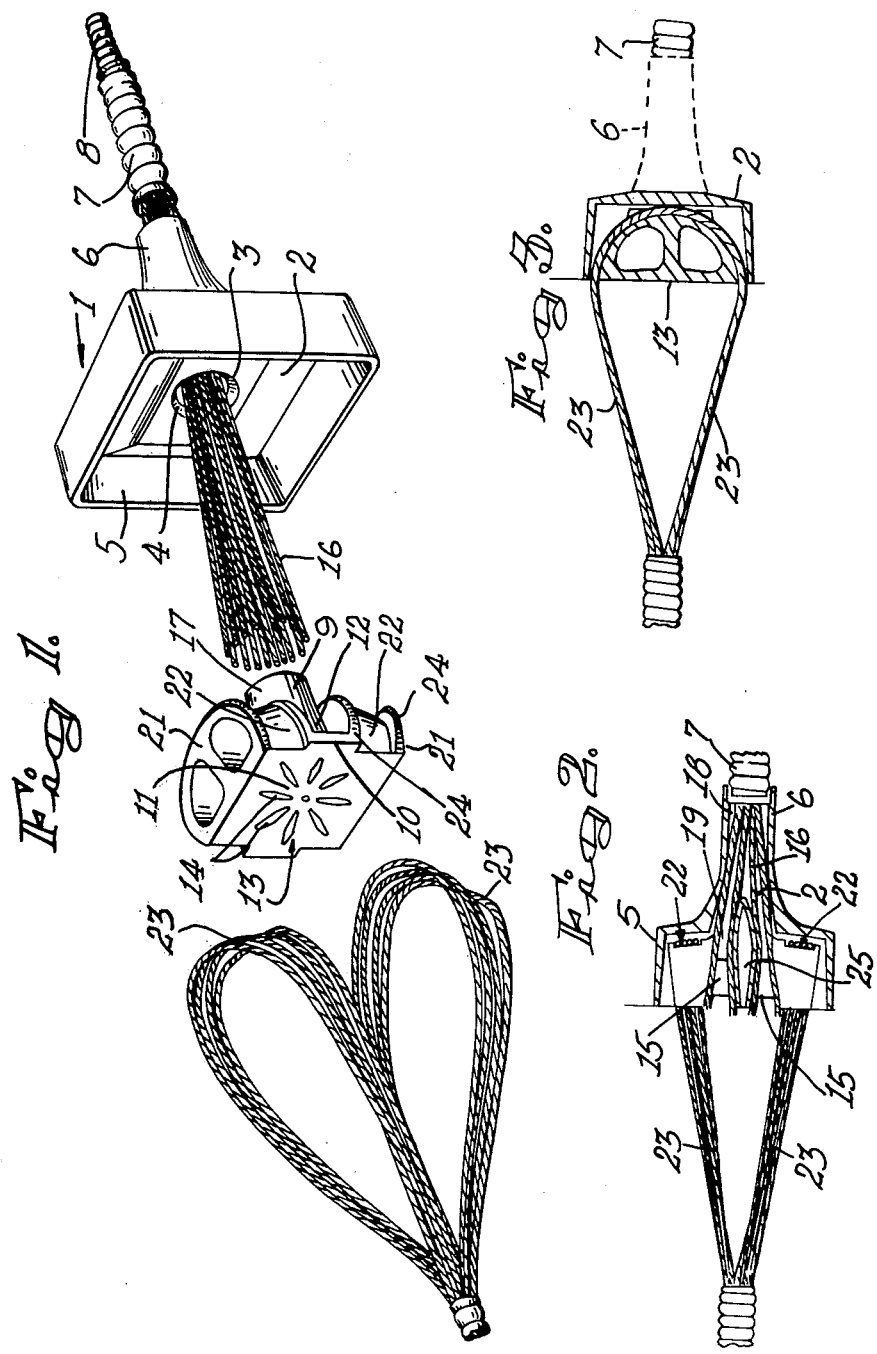

CABLE ANCHORING AND COUPLING EQUIPMENT

BACKGROUND OF THE INVENTION

This invention relates to equipment for pretensioned or post-tensioned prestressed cementitious structures and more particularly to means for anchoring and coupling the ends of cables used in such structures.

In this specification, the term "cable" is used in a broad sense so as to include in the scope of its meaning wires, strands and cables in general.

In the post-stressing of concrete structures, cables are placed in position prior to pouring of the concrete. Protective sheaths are located around the cables so that the latter may be elongated, under tension, within the concrete. After the concrete is poured a tensioning force is applied to the cables which are anchored at each end to the concrete to induce a compressive force in the structure.

A generally accepted method of poststressing involves anchoring one end into the structure, called the dead end anchor, and applying the tension to the other end of the cables which are subsequently held in position by a cable anchor. One such anchor which is very effective in use is that described in U.S. Pat. No. 3,983,606.

The dead end anchor can conveniently be formed by making the cables extend through the structure as a long loop with the looped end of the cables exposed from the sheath and located around vertical rods which are buried in the concrete. These looped cables enable a very inexpensive but positive dead end anchor to be obtained.

Furthermore, it is often required to couple together cable ends protruding toward one another from adjacent structures and to apply a tensioning force to the joined cables. This is particularly the case in continuous span beams used in bridges and other concrete structural work.

The coupling of contiguous reinforcing cables is usually a somewhat difficult operation and most couplers are expensive units.

For example there is the anchor-coupler type unit described in U.S. Pat. No. 3,973,297 wherein ends of cables are inserted into blind passages containing spring loaded wedge assemblies adapted to automatically prevent withdrawal of the cables.

In alternative arrangements separate couplers are used for each cable wherein the ends of such contiguous cables are each fitted into an anchor assembly and the anchor assemblies located in an axially extending tubular member. These assemblies usually require expensive machine operations in their production.

Couplers comprising housings having oppositely directed tapered passages therein into which wedges are introduced to secure the contiguous cables have been effectively used but their assembly is a tedious operation.

SUMMARY OF THE INVENTION

It is the object of the present invention to provide a cable anchor and coupler which overcomes to a large extent the difficulties encountered with presently known articles of this nature as well as a method of poststressing continuous span reinforced concrete beams.

According to this invention there is provided a reinforcing cable anchor and coupler comprising a base plate having an aperture therethrough and supporting a cable anchor the body of which includes an external surface curved conversely towards the socket base and spaced apart therefrom and adapted to receive a looped end of a reinforcing cable.

Further features of this invention provide for the base plate to be in the form of a socket and separable from the coupler, for the coupler to have a pair of curved surfaces symmetrically disposed on each side of the anchor and for these surfaces to be provided by semicylindrical projections on the coupler body.

The invention also provides for the anchor to be of the type set forth in U.S. Pat. No. 3,983,606.

These and other features of this invention will become apparent from the description of preferred embodiments set out below and from the accompanying drawings to which reference is made in the description.

BRIEF DESCRIPTION OF THE DRAWINGS

FIG. 1 is an exploded perspective view of a cable anchor and coupler assembly;

FIG. 2 is a vertical cross section through the cable anchor and coupler when operatively positioned in a structure; and FIG. 3 is a horizontal cross section through the upper section of the cable anchor and coupler when operatively positioned.

DETAILED DESCRIPTION OF PREFERRED EMBODIMENTS

As shown in FIG. 1 the cable anchor and coupler according to this invention is made in two separate parts.

The first part 1 is a box-like socket member provides a base plate 2 having a central aperture 3 therethrough. An annular recess 4 is provided around the aperture 3 within the socket provided by base plate 2 and peripheral outwardly projecting flange 5.

On the opposite side of the base plate 2 extends a conical housing 6 to the outer end of which is fitted coupler sheath 7 connecting the housing 6 to the cable sheath 8. The housing 6 and sheaths 7 and 8 are provided to shield the cable and the ends which spread outwardly into the cable anchor 9 described below. As stated above the sheaths are located around the cables so that the latter may be elongated after concrete has been cast around the cables to poststress the concrete.

The anchor and coupler consists of a body 10 the central part 11 of which forms the anchor and is preferably, and as illustrated, of the type set forth in U.S. Pat. No. 3,983,606.

Briefly where the anchor and coupler are suitable for a sixteen cable reinforcement the anchor consists of a housing 12 of generally frusto-conical shape with a flat base 13.

A set of eight passages 14 are provided through the housing 12 each passage being adapted to receive a wedge 15 for engaging two cables 16. The passages 14 initiate at the base 13 of the housing and terminate at the opposite and smaller end 17 of the housing 12. The passages are inclined to each other and meet at the smaller end of the housing to form a common passage 18.

Each passage 14 is basically rectangular in cross-section and has two opposite sides 19 parallel whereas the other two opposite sides 20 are inclined to each other.

Further the inclined sides 20 are preferably concave to conform substantially with the surface of a cable 16 as is apparent from the drawings.

Each passage 14 has a wedge 15 associated therewith which conforms to the shape of the passages 14. That is, the wedge has two flat opposite and parallel sides whereas the other two opposite sides are inclined to each other. The latter sides are also preferably concave to conform to the surface of a cable to be engaged by the wedge.

The outwardly projecting small end 17 of the housing 12 is formed so that it will engage in the recess 4.

The coupler section of the assembly consists of two oppositely disposed semi-cylindrical projections 21 on the anchor. One side of the projections is formed by an extension of the flat base 13 of the anchor.

The other side of each projection 21 is curved convexly towards the small end 17 of the anchor and does not extend to the end of that end. Thus when end 17 is engaged in recess 4 the curved surfaces 22 on the projections 21 are spaced apart from the surface of the base plate 2 by a distance which will enable a looped cable end 23 to be fitted thereover.

Peripheral ribs 24 are provided at each end of each curved surface 22 and those on the one surface are splayed outwardly from those on the other in the direction of the small end 17 of the anchor.

The projections 21 are made hollow as indicated to reduce the weight and cost of the anchor and coupler unit.

The use of the anchor and coupler unit will be described as applied to the construction of a continuous span reinforced poststressed concrete beam suitable, for example, for a bridge structure.

The reinforcing rod network is prepared for the beam in accordance with the particular design. A multi-strand post-stressing cable is prepared and sheathed to have a dead-end loop at one end or live anchored end as in U.S. Pat. No. 3,983,606 and this end is supported within the reinforcing network. More than one such cable may be included depending on the design of the beam.

At the opposite end of the network shuttering is erected and the first part 1 of the anchor and coupler unit is included in this shutter to accommodate the ends of the strands of each cable through the conical housing 6. The part 1 is so arranged that the outer edge of the peripheral flange 5 will be flush with the end of the cast concrete.

The remaining shuttering is erected around the reinforcing and the beam cast in concrete in conventional manner.

To poststress the cast and set beam the ends of the cable projecting through the base plate 2 of each part 1 are threaded into the anchor of the body part 11.

The cables are then tensioned in known manner to stress the beam and the wedges 15 inserted to secure a strand between each side of each wedge and the wall of the associated passage 14 through the housing 12. The tension applied to the cables when anchored by the wedges 15 transmits the force through the anchor to the base plate 2 and then to the concrete of the beam.

The ends of the strands projecting through the anchor can be cropped sufficiently close to the flat base 13 to enable reinforcing for a contiguous length of the continuous span beam to be erected, or can preferably be left to be cast into concrete for use as reinforcement.

After the poststressing is completed it is necessary that grout be introduced into the beam to solidify the structure. FIG. 2 of the drawings illustrates how the anchor body 10 may have a hollow central portion 25 so that grout can be introduced into the spaces between the cable strands.

When the shuttering has been removed, the reinforcing for the next section of the beam is erected and the dead end loops 23 for each cable slipped into the boxlike part of the socket member and over the projections 21 to engage around the curved surfaces 22 on the projections 21 where they are held in proper location by the ribs 24. This is shown in FIGS. 2 and 3 of the accompanying drawings.

The next section of the beam is cast as described above for the first section and this part stressed. It will be apparent that this part stressing extends the force applied to the cables to those of the first section of the beam through the anchor and coupler unit at the end of the first section.

These operations can be repeated over the full length of the continuous span beam and at the free end of the last section to be cast there may be provided an anchor as described in U.S. Pat. No. 3,983,606.

The cable anchor and coupler unit and the method of post-stressing can be varied from the specific form described above without departing from the scope of the invention. For example it is not essential for the flange 5 to be included though this does protect the body 10 until it is cast into the next contiguous length of the beam. Also it will be readily apparent but two projections 21 are not essential where, say, a two strand cable is used for poststressing the concrete structure.

It will be appreciated further that the anchor and coupler unit can be made as a single part but this not only will increase its costs but will also make it less convenient in practical use than where the base plate is separate from and forms an adaptor for the small end 17 of the anchor. Under some circumstances it may be advantageous to have the curved surfaces 22 splayed in the opposite direction to that described where for example, one coupler is used with a loop from two different cables.

Also the unit is not confined to the particular anchor assembly described but it is considered that this type is most effective in practical use.

What we claim as new and desire to secure by Letters Patent is:

1. An anchor and coupler, for
   a first reinforcing cable member which has a plurality of individual cable free ends at one end thereof, and
   a second reinforcing cable member which terminates in at least one loop including at least one individual cable therein,
   said anchor and coupler comprising:
   (a) a base plate having means defining an aperture therethrough, through which said one end of said first reinforcing cable may be passed, so that the individual cable free ends become disposed beyond said base plate; and
   (b) a combined anchor and coupler body which includes:
      (i) means for anchoring said free ends of said first reinforcing cable member;
      (ii) lateral projection means on said anchoring means and including means providing an external surface curved convexly towards said base plate; and
      (iii) spacer means on said anchoring means, which, in use, engage axially between said anchoring means and said base plate proximally of said aperture and limit proximity of the lateral projection means to the base plate, so that sufficient space remains axially between said convexly curved external surface and said base plate, so that said at least one loop of said second reinforcing cable may be looped about said lateral projection means and pulled axially forwards into engagement with said convexly curved external surface within said sufficient space.

2. A reinforcing cable anchor and coupler as claimed in claim 1 in which the base plate is in the form of a socket separate from the cable anchor body and has a peripheral flange extending towards the cable anchor body and a conical housing around the aperture extending on the opposite side of the plate to the flange.

3. A reinforcing cable anchor and coupler as claimed in claim 1 in which the anchor has a pair of oppositely extending semicylindrical projections each providing a said curved surface spaced from the base plate.

4. A reinforcing cable anchor and coupler as claimed in claim 3 in which peripheral ribs are provided at each end of each said curved surface which ribs are splayed outwardly from those on the other in a direction towards the base plate.

5. A reinforcing cable anchor and coupler as claimed in claim 2 in which the anchor comprises a housing having a longitudinal axis, said housing having a plurality of passages therethrough inclined toward each other so as to meet at one end of the housing, each passage being of basically rectangular cross section with two opposite surfaces substantially parallel whereas the other two opposite surfaces are convergent toward each other, at least one of said convergent surfaces of each passage being inclined toward said axis and a single wedge having a generally rectangular cross section, positioned within each passage and adapted to fit therein so that in use it will engage two cables, one cable against each convergent side thereof, the co-operating walls of the passages and associated wedges being shaped to conform to the cable to be engaged therebetween.

* * * * *